US012356160B2

(12) United States Patent
Yonemori

(10) Patent No.: US 12,356,160 B2
(45) Date of Patent: Jul. 8, 2025

(54) MULTI-CHANNEL AUDIO SYSTEM, MULTI-CHANNEL AUDIO DEVICE, PROGRAM, AND MULTI-CHANNEL AUDIO PLAYBACK METHOD

(71) Applicant: D&M Holdings, Inc., Kanagawa (JP)

(72) Inventor: Kazuhiko Yonemori, Kanagawa (JP)

(73) Assignee: D&M HOLDINGS, INC., Kanagawa (JP)

( * ) Notice: Subject to any disclaimer, the term of this patent is extended or adjusted under 35 U.S.C. 154(b) by 149 days.

(21) Appl. No.: 17/906,290

(22) PCT Filed: Sep. 29, 2020

(86) PCT No.: PCT/JP2020/036941
§ 371 (c)(1),
(2) Date: Sep. 14, 2022

(87) PCT Pub. No.: WO2021/192367
PCT Pub. Date: Sep. 30, 2021

(65) Prior Publication Data

US 2023/0101944 A1 Mar. 30, 2023

(30) Foreign Application Priority Data

Mar. 26, 2020 (JP) ................................ 2020-056893

(51) Int. Cl.
*H04R 3/12* (2006.01)
*G10K 11/178* (2006.01)
*H04R 29/00* (2006.01)

(52) U.S. Cl.
CPC ............ *H04R 3/12* (2013.01); *G10K 11/178* (2013.01); *H04R 29/002* (2013.01); *H04R 2420/07* (2013.01)

(58) Field of Classification Search
CPC .......... H04R 3/12; H04R 5/04; H04R 29/002; H04R 2420/07; H04S 7/301;
(Continued)

(56) References Cited

U.S. PATENT DOCUMENTS 7,123,731 B2 * 10/2006 Cohen .................... H04S 7/301 381/103
7,801,317 B2 * 9/2010 Kim ....................... H04S 1/002 381/1

(Continued)

FOREIGN PATENT DOCUMENTS

JP 2000-354300 12/2000
JP 2002-367290 12/2002

(Continued)

OTHER PUBLICATIONS

International Search Report for PCT/JP2020/036941 mailed Dec. 22, 2020.

*Primary Examiner* — Paul Kim
(74) *Attorney, Agent, or Firm* — Nieves IP Law Group, LLC; Peter A. Nieves

(57) ABSTRACT

[Problem] To provide a technology capable of comfortably enjoying audio content via multiple channels even in a noisy environment. [Solution] A wireless terminal 3 is disposed at a listening point of a multi-channel audio device 1. The multi-channel audio device 1 plays a multi-channel audio signal as audio playback signals of a plurality of channels, and outputs an audio playback signal for each channel from the corresponding speaker 2, and the wireless terminal 3 collects the environmental sound at the listening point, and transmits the sound collection signal to the multi-channel audio device 1. The multi-channel audio device 1 identifies, as a noise component, the difference between the sound collection signal received from the wireless terminal 3 and the audio playback signals of the plurality of channels output (Continued)

from the plurality of speakers, generates a noise canceling signal with the opposite phase to the noise component, and outputs the noise canceling signal from any speaker 2.

11 Claims, 9 Drawing Sheets

(58) Field of Classification Search
CPC ....... G10K 11/17833; G10K 11/17875; G10K 11/17817; G10K 11/178; G10K 2210/1053; G10K 2210/504
USPC ........................................................... 381/59
See application file for complete search history.

(56) References Cited

U.S. PATENT DOCUMENTS

| | | | | |
|---|---|---|---|---|
| 10,229,698 | B1 * | 3/2019 | Chhetri | H04R 3/005 |
| 2007/0133810 | A1 | 6/2007 | Kishi | |
| 2009/0316923 | A1 * | 12/2009 | Tashev | H04R 3/005<br>381/71.1 |
| 2010/0124336 | A1 | 5/2010 | Shridar et al. | |
| 2016/0196818 | A1 * | 7/2016 | Christoph | H04S 7/301<br>381/71.6 |

FOREIGN PATENT DOCUMENTS

| | | |
|---|---|---|
| JP | 2007-135094 | 5/2007 |
| JP | 2007-259391 | 10/2007 |
| JP | 2010-244053 | 10/2010 |

* cited by examiner

ACOUSTIC PROFILE INFORMATION SETTING OPERATION

MULTI-CHANNEL AUDIO SYSTEM, MULTI-CHANNEL AUDIO DEVICE, PROGRAM, AND MULTI-CHANNEL AUDIO PLAYBACK METHOD

CROSS-REFERENCE TO RELATED APPLICATIONS

This application is the national stage of International Application No. PCT/JP2020/036941, filed Sep. 29, 2020, entitled MULTI-CHANNEL AUDIO SYSTEM, MULTI-CHANNEL AUDIO DEVICE, PROGRAM, AND MULTI-CHANNEL AUDIO PLAYBACK METHOD which claims the benefit of Japanese Patent Application serial number 2020-056893, filed Mar. 26, 2020, both of which are incorporated by reference herein in their entirety.

TECHNICAL FIELD

The present invention relates to a technology for reproducing multi-channel audio.

BACKGROUND ART

There is known a multi-channel audio device that reproduces a multi-channel audio signal through use of a plurality of speakers. For example, a multi-channel audio device as described in Patent Literature 1 amplifies an audio reproduction signal for each channel of a multi-channel audio signal, and outputs the audio reproduction signal from a speaker corresponding to this channel.

In addition, some multi-channel audio devices enable acoustic profile information (including an output timing and a volume level) on an audio reproduction signal to be set for each channel of the multi-channel audio signal. For example, a multi-channel audio device as described in Patent Literature 2 collects, for each channel of a multi-channel audio signal, sound of a test signal output from a speaker corresponding to this channel by a dedicated measurement microphone installed at a listening point, and measures a delay time and an attenuation rate of the sound. Then, the acoustic profile information is set for each channel of the multi-channel audio signal so that acoustic characteristics of the audio reproduction signal output from the speaker corresponding to this channel are optimum at the listening point.

CITATION LIST

Patent Literature

[PTL 1] JP 2002-367290 A
[PTL 2] JP 2000-354300 A

SUMMARY OF INVENTION

Technical Problem

With the multi-channel audio devices of the related art as described in Patent Literature 1 and Patent Literature 2, a user can enjoy realistic-feeling sounds owing to the audio reproduction signals of the respective channels which are output from a plurality of speakers. However, in an environment having noise in the surroundings, the noise may hinder the user from enjoying music or other contents with clear sounds. This point is not taken into consideration in the multi-channel audio devices of the related art.

In addition, the multi-channel audio device of the related art as described in Patent Literature 2 which can set acoustic profile information for each channel requires a dedicated measurement microphone to be attached, and is accordingly increased in cost. The dedicated measurement microphone also requires to be connected to the multi-channel audio device by a cord, which is a hassle.

The present invention has been made in view of the above-mentioned circumstances, and an object thereof is to provide a technology for enabling comfortable enjoyment of audio contents in multiple channels even in an environment having noise. Another object of the present invention is to provide a technology capable of generating acoustic profile information on each channel of multi-channel audio by simple operation without increasing cost.

Solution to Problem

In order to solve the above-mentioned problems, according to a first aspect of the present invention, a wireless terminal provided with a microphone, such as a smartphone, a tablet PC, or a smart speaker, is placed at a listening point of a multi-channel audio device. The multi-channel audio device reproduces, from a multi-channel audio signal, audio reproduction signals of a plurality of channels, and outputs the audio reproduction signals of the respective channels for each channel separately from the channels' corresponding speakers. The wireless terminal collects ambient sounds at the listening point, and feeds collected sound signals of the collected sounds back to the multi-channel audio device. The multi-channel audio device identifies, as noise components, differences between the collected sound signals fed back from the wireless terminal and the audio reproduction signals of the plurality of channels output from the plurality of speakers, and generates noise canceling signals opposite in phase from the identified noise components. The multi-channel audio device outputs the noise canceling signals from one of the plurality of speakers. Alternatively, the multi-channel audio device transmits the noise canceling signals to the wireless terminal to output the noise canceling signals from the wireless terminal.

For example, according to the first aspect of the present invention, there is provided a multi-channel audio system including: a multi-channel audio device configured to reproduce and output a multi-channel audio signal with use of a plurality of speakers; and a wireless terminal placed at a listening point of the multi-channel audio device, the wireless terminal including: sound collection means for collecting ambient sounds at the listening point; and collected sound signal transmitting means for transmitting, to the multi-channel audio device, collected sound signals of the ambient sounds collected by the sound collection means, the multi-channel audio device including: audio reproduction means for reproducing, from the multi-channel audio signal, audio reproduction signals of a plurality of channels; audio output means for outputting, for each of the plurality of channels separately, the audio reproduction signals of the plurality of channels reproduced by the audio reproduction means, in a manner that outputs the audio reproduction signal of one channel from one of the plurality of speakers that corresponds to the one channel; collected sound signal receiving means for receiving the collected sound signals from the wireless terminal; noise component identifying means for identifying, as noise components, differences between the collected sound signals received by the collected sound signal receiving means and the audio reproduction signals of the plurality of channels that are output by the audio output means from the plurality of speakers; noise canceling signal generating means for generating noise canceling signals opposite in phase from the noise components identified by the noise component identifying means; and noise canceling signal output means for outputting the noise canceling signals generated by the noise canceling signal generating means from one of the plurality of speakers.

According to a second aspect of the present invention, in the above-mentioned first aspect, the wireless terminal placed at the listening point is provided with a recording and reproducing function. The wireless terminal includes a source sound of a test signal. When the wireless terminal receives test signal reproducing operation from a user, the wireless terminal transmits a test signal reproducing instruction including a designated channel to the multi-channel audio device, records, as channel reproduction data, the test signal output from the multi-channel audio device through one of the plurality of speakers that corresponds to the designated channel, and reproduces the source sound of the test signal to record this reproduced source sound as source sound reproduction data, without externally outputting the reproduced source sound from a speaker thereof. The wireless terminal then transmits the channel reproduction data of the designated channel and the source sound reproduction data to the multi-channel audio device. The multi-channel audio device compares the channel reproduction data and the source sound reproduction data to each other to measure a delay time and an attenuation rate of the channel reproduction data with respect to the source sound reproduction data. The multi-channel audio device generates, based on results of the measurement, acoustic profile information including an output timing and a volume level of the designated channel, and sets this acoustic profile information as conditions under which an audio reproduction signal of the designated channel is output.

For example, according to the second aspect of the present invention, in the multi-channel audio system of the above-mentioned first aspect, the wireless terminal further includes: test signal reproduction instruction means for transmitting, to the multi-channel audio device, a test signal reproducing instruction including a designated channel, by following test signal reproducing operation received from a user; channel reproduction data recording means for recording, as channel reproduction data of the designated channel, a test signal that is output, in response to the test signal reproducing instruction transmitted by the test signal reproduction instruction means, from the multi-channel audio device via a corresponding speaker and collected by the sound collection means, the corresponding speaker being one of the plurality of speakers that corresponds to the designated channel; source sound reproduction data recording means for reproducing, in synchronization with start of the recording by the channel reproduction data recording means, a source sound of the test signal that is stored in advance, and recording reproduction data of the source sound as source sound reproduction data, without externally outputting the reproduction data of the source sound; and measurement data transmitting means for transmitting, to the multi-channel audio device, measurement data of the designated channel which includes the channel reproduction data of the designated channel recorded by the channel reproduction data recording means and the source sound reproduction data recorded by the source sound reproduction data recording means, and the multi-channel audio device further includes: test signal reproducing means for reproducing, by following the test signal reproducing instruction received from the wireless terminal, a source sound of the test signal that is stored in advance, and outputting the source sound from the one of the plurality of speakers that corresponds to the designated channel included in the test signal reproducing instruction; measurement data receiving means for receiving the measurement data of the designated channel from the wireless terminal; measurement means for measuring, through a comparison between the channel reproduction data and the source sound reproduction data that are included in the measurement data of the designated channel received by the measurement data receiving means, a delay time and an attenuation rate of the channel reproduction data with respect to the source sound reproduction data of the designated channel; acoustic profile information generating means for generating, based on the delay time and the attenuation rate measured by the measurement means as the delay time and the attenuation rate of the channel reproduction data with respect to the source sound reproduction data of the designated channel, acoustic profile information of the designated channel which includes an output timing and a volume level; and acoustic profile information setting means for setting the acoustic profile information of the designated channel generated by the acoustic profile information generating means, as conditions under which the audio reproduction signal of the designated channel is output.

Advantageous Effects of Invention

According to the first aspect of the present invention, the audio reproduction signals of the respective channels output by the multi-channel audio device for each channel separately from the channels' corresponding speakers are collected through sound collection by the wireless terminal placed at the listening point of the multi-channel audio device, and collected sound signals thereof are fed back to the multi-channel audio device. Further, the multi-channel audio device identifies, as noise components, differences between the collected sound signals fed back from the wireless terminal and the audio reproduction signals of the plurality of channels output from the plurality of speakers, and outputs noise canceling signals opposite in phase from the noise components, from one of the plurality of speakers or from the wireless terminal. Accordingly, even in an environment having noise, comfortable enjoyment of multi-channel audio is accomplished by canceling the noise.

According to the second aspect of the present invention, a wireless terminal provided with a recording and reproducing function, such as a smartphone, a tablet PC, or a smart speaker, is used as a measurement microphone for generating acoustic profile information, and hence a dedicated measurement microphone is not required to be attached to the multi-channel audio device. It also suffices that a user places the wireless terminal at the listening point of the multi-channel audio device, and the user is not required to connect the wireless terminal and the multi-channel audio device to each other by a cord. Acoustic profile information of each channel can accordingly be generated by simple operation without increasing cost.

DESCRIPTION OF EMBODIMENTS

Now, one embodiment of the present invention is described with reference to the drawings.

Figure 1:
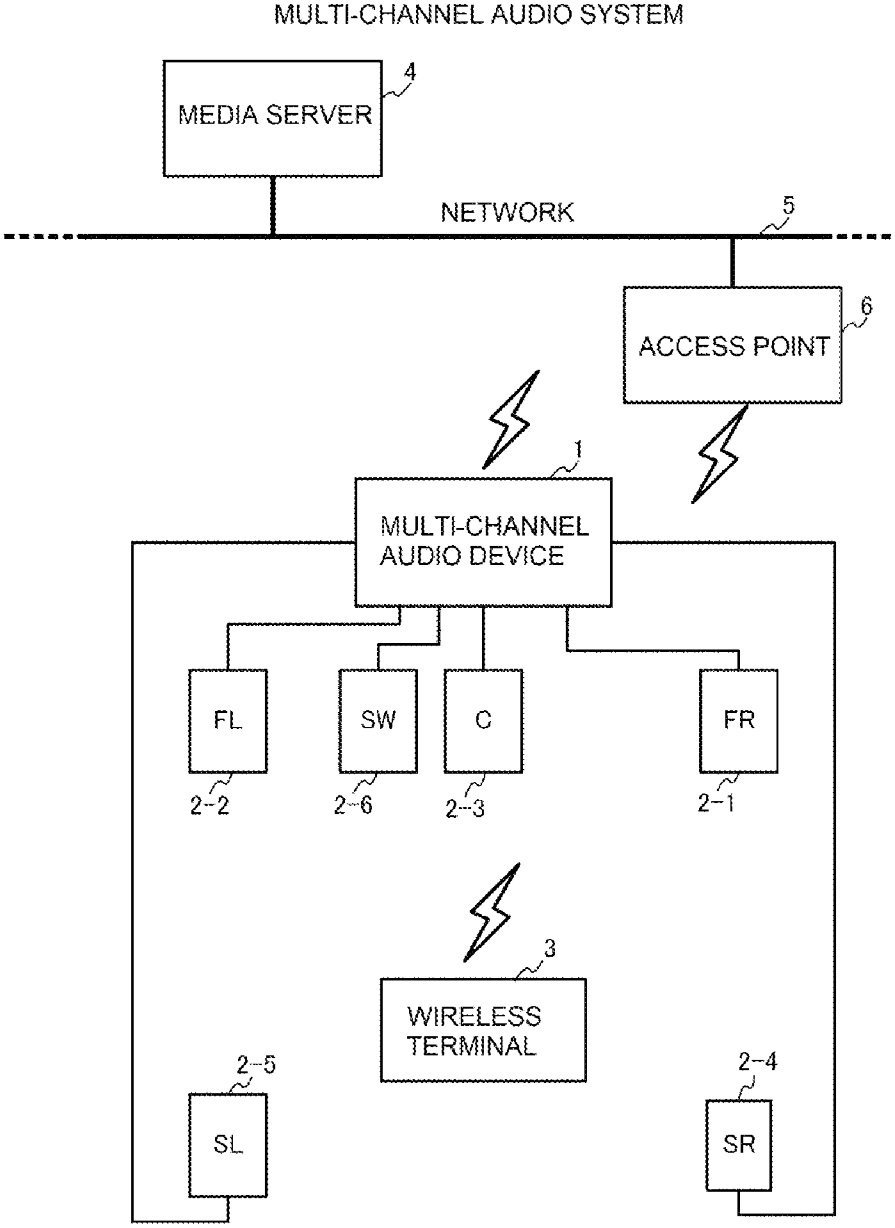
FIG. 1 is a schematic configuration diagram of a multi-channel audio system according to one embodiment of the present invention.

FIG. 1 is a schematic configuration diagram of a multi-channel audio system according to this embodiment.

As illustrated in FIG. 1, the multi-channel audio system according to this embodiment includes a multi-channel audio device 1 connected to a media server 4 via an access point 6 and a network 5, such as a WAN or a LAN, and a wireless terminal 3 wirelessly connected to the multi-channel audio device 1 via the access point 6.

The multi-channel audio device 1 downloads a multi-channel audio signal from the media server 4, reproduces, from the downloaded multi-channel audio signal, audio reproduction signals of a plurality of channels, and outputs the audio reproduction signals from a plurality of speakers 2-1 to 2-6 (hereinafter may simply be referred to as "speakers 2").

In this embodiment, a case of reproducing and outputting a multi-channel audio signal of 5.1 channels is illustrated as an example, and the six speakers 2-1 to 2-6 corresponding to a front right (FR) channel, a front left (FL) channel, a center (C) channel, a surround right (SR) channel, a surround left (SL) channel, and a sub-woofer (SW) channel are connected to the multi-channel audio device 1. The multi-channel audio device 1 reproduces, from the multi-channel audio signal of 5.1 channels, audio reproduction signals of the FR channel, the FL channel, the C channel, the SR channel, the SL channel, and the SW channel, and outputs the audio reproduction signals of the respective channels from the speakers 2-1 to 2-6 of the respective channels.

The wireless terminal 3 is a smartphone, a tablet PC, a smart speaker, or the like that is provided with a recording and reproducing function, and functions as a controller for remotely operating the multi-channel audio device 1. The wireless terminal 3 is placed at a listening point of the multi-channel audio device 1 to provide the multi-channel audio device 1 with information required to generate, for each channel, acoustic profile information defining conditions under which an audio reproduction signal is output, and to generate a noise canceling signal for canceling out noise at the listening point.

Figure 2:
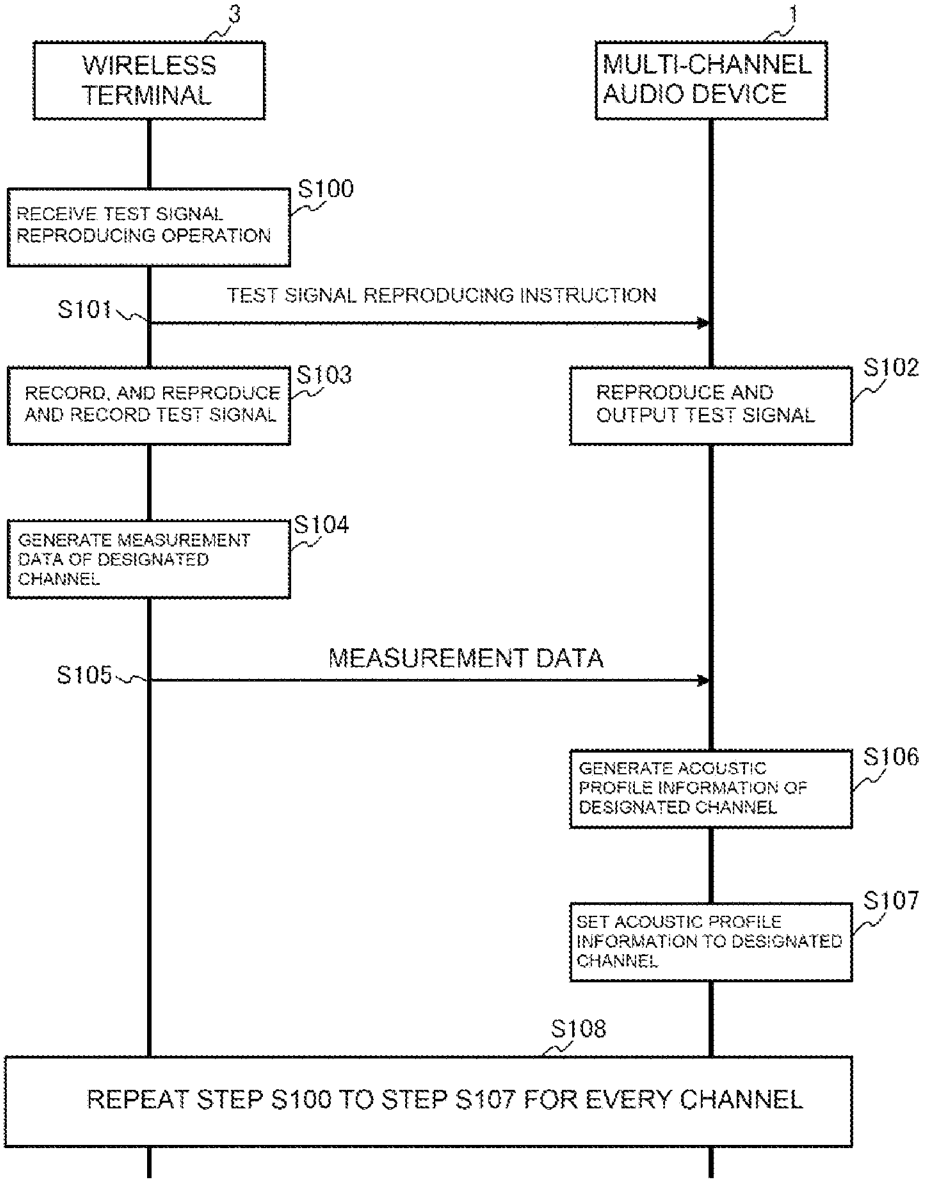
FIG. 2 is a sequence diagram for illustrating acoustic profile information setting operation of the multi-channel audio system.

FIG. 2 is a sequence diagram for illustrating acoustic profile information setting operation of the multi-channel audio system.

First, the wireless terminal 3 receives test signal reproducing operation accompanied by a designated channel (a channel to be used to reproduce a test signal) from a user (Step S100), and transmits a test signal reproducing instruction including the designated channel to the multi-channel audio device 1 (Step S101).

The multi-channel audio device 1 receives the instruction, reproduces a source sound of the test signal which is registered in advance, and outputs the test signal from one of the speakers 2 that corresponds to the designated channel (Step S102). Meanwhile, the wireless terminal 3 starts sound collection, records, as channel reproduction data of the designated channel, the test signal output from the multi-channel audio device 1, and reproduces the pre-registered source sound of the test signal in synchronization with the start of sound collection to record reproduction data of the source sound as source sound reproduction data, without externally outputting the source sound (Step S103).

Next, the wireless terminal 3 generates measurement data including the channel reproduction data and the source sound reproduction data as well as the designated channel (Step S104). The wireless terminal 3 then transmits the measurement data to the multi-channel audio device 1 (Step S105).

The multi-channel audio device 1 receives the measurement data from the wireless terminal 3, and generates, based on the channel reproduction data and the source sound reproduction data that are included in the measurement data, acoustic profile information of the designated channel included in the measurement data (Step S106). Specifically, through a comparison between the channel reproduction data and the source sound reproduction data, a delay time and an attenuation rate of the channel reproduction data with respect to the source sound reproduction data are measured, and, based on results of the measurement, acoustic profile information of the designated channel including an output timing and a volume level is generated.

The multi-channel audio device 1 then sets the thus generated acoustic profile information of the designated channel as conditions under which an audio reproduction signal of the designated channel is output (Step S107).

The processing steps of from Step S100 to Step S107 are repeated for every channel of the multi-channel audio signal reproduced by the multi-channel audio device 1 (Step S108). In this manner, for each channel of the multi-channel audio signal, the acoustic profile information is set as conditions under which an audio reproduction signal of the channel is output so that acoustic characteristics of the audio reproduction signal output from one of the speakers 2 that corresponds to the channel are optimum at the listening point of the multi-channel audio device 1.

Figure 3:
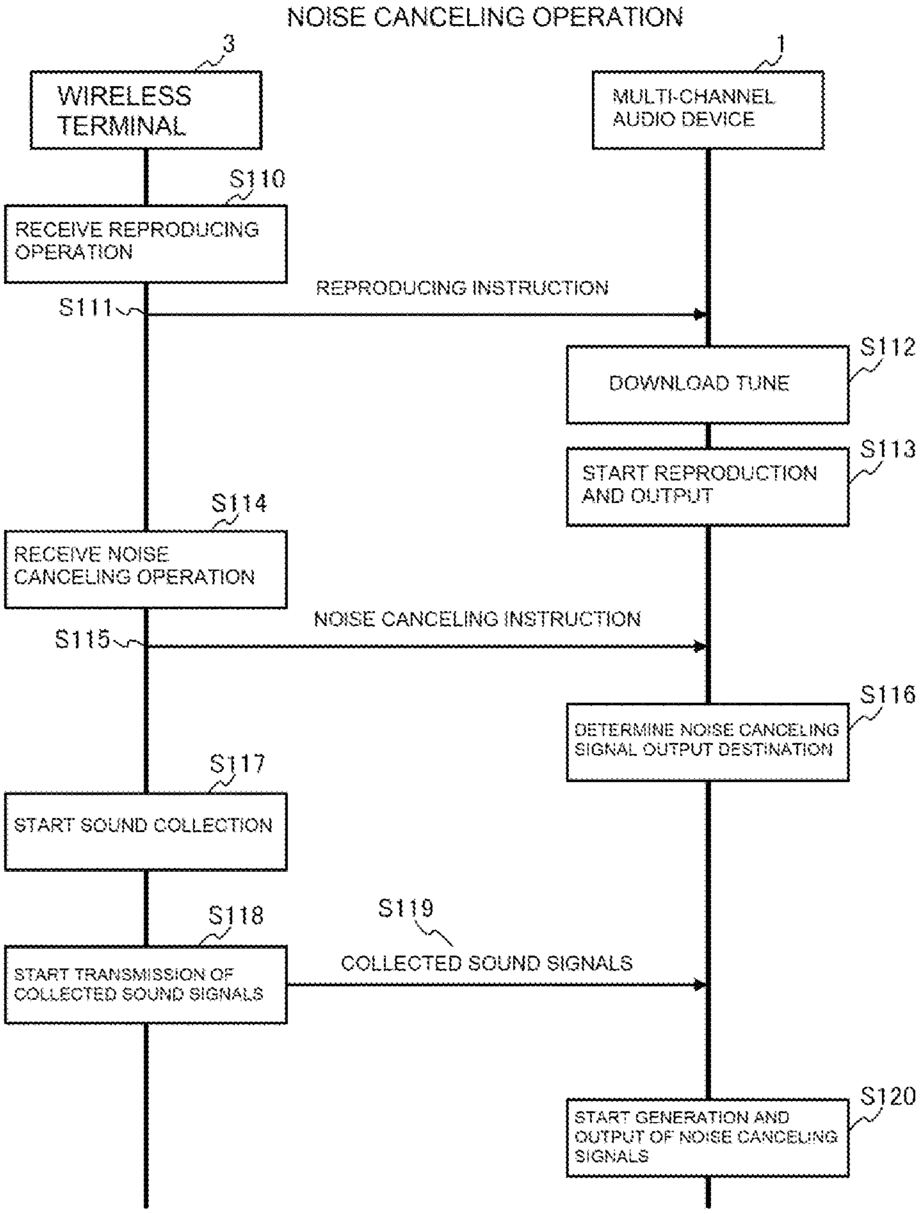
FIG. 3 is a sequence diagram for illustrating noise canceling operation of the multi-channel audio system.

FIG. 3 is a sequence diagram for illustrating noise canceling operation of the multi-channel audio system.

This sequence diagram is premised on that the acoustic profile information setting operation illustrated in FIG. 2 has been executed.

First, the wireless terminal 3 receives reproducing operation accompanied by designation of a tune from the user (Step S110), and transmits a reproducing instruction accompanied by designation of the tune to the multi-channel audio device 1 (Step S111).

The multi-channel audio device 1 receives the instruction, and accesses the media server 4 via the access point 6 and the network 5 to download a multi-channel audio signal of the tune designated by the reproducing instruction (Step S112). The multi-channel audio device 1 then starts reproduction and output of this multi-channel audio signal (Step S113). Specifically, the multi-channel audio device 1 reproduces, from a multi-channel audio signal of 5.1 channels downloaded from the media server 4, audio reproduction signals of the FR channel, the FL channel, the C channel, the SR channel, the SL channel, and the SW channel, and outputs the audio reproduction signals of the respective channels from the speakers 2-1 to 2-6 of the respective channels, with the output timing and the volume level adjusted in accordance with pieces of acoustic profile information set to the respective channels.

Next, the wireless terminal 3 receives noise canceling operation from the user (Step S114), and transmits a noise canceling instruction to the multi-channel audio device 1 (Step S115). The multi-channel audio device 1 receives the instruction, and determines which of the speakers 2-1 to 2-6 connected to the multi-channel audio device 1 is to be a noise canceling signal output destination (Step S116). Specifically, one of the speakers 2 that corresponds to a channel having the latest timing as the output timing included in the acoustic profile information, namely, one of the speakers 2 that is closest to the listening point of the multi-channel audio device 1, is determined as the noise canceling signal output destination.

Next, the wireless terminal 3 starts sound collection of ambient sounds at the listening point of the multi-channel audio device 1 (Step S117), and starts transmission (feedback) of collected sound signals thereof to the multi-channel audio device 1 (Step S118 and Step S119).

The multi-channel audio device 1 starts processing of identifying, as noise components, differences between the collected sound signals sequentially sent from the wireless terminal 3 and the audio reproduction signals of the FR channel, the FL channel, the C channel, the SR channel, the SL channel, and the SW channel which are sequentially output from the speakers 2-1 to 2-6, generating noise canceling signals opposite in phase from the identified noise components, and sequentially outputting the noise canceling signals from one of the speakers 2 that has been determined to be the noise canceling signal output destination (Step S120). In this manner, noise which is sounds other than those of the audio reproduction signals output from the multi-channel audio device 1 is canceled out by the noise canceling signals at the listening point of the multi-channel audio device 1.

Next, details of the multi-channel audio device 1 and the wireless terminal 3, which are included in the multi-channel audio system according to this embodiment, are described.

First, the details of the multi-channel audio device 1 are described.

Figure 4:
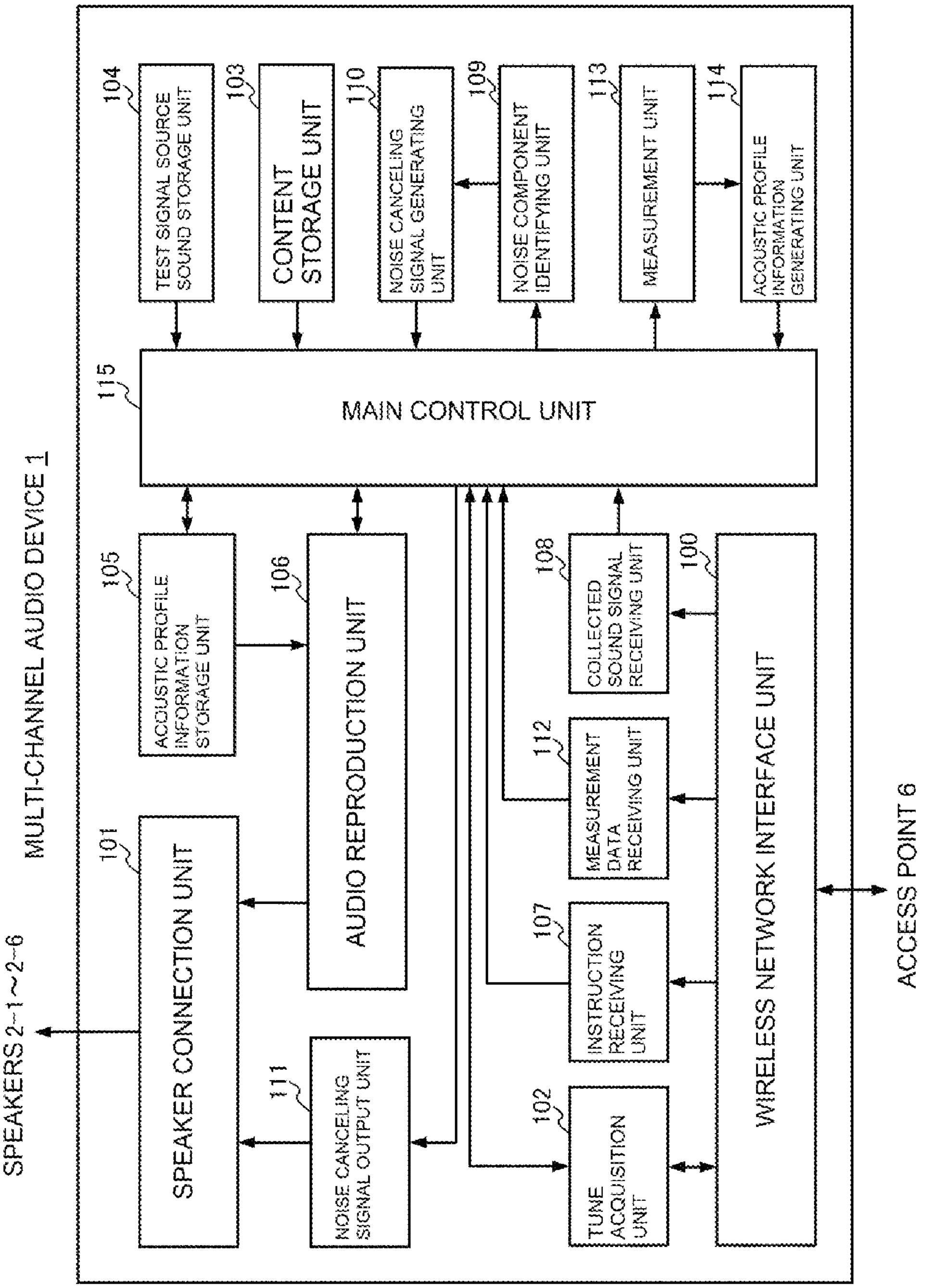
FIG. 4 is a schematic functional configuration diagram of a multi-channel audio device (1).

FIG. 4 is a schematic functional configuration diagram of the multi-channel audio device 1.

As illustrated in FIG. 4, the multi-channel audio device 1 includes a wireless network interface unit 100, a speaker connection unit 101, a tune acquisition unit 102, a content storage unit 103, a test signal source sound storage unit 104, an acoustic profile information storage unit 105, an audio reproduction unit 106, an instruction receiving unit 107, a collected sound signal receiving unit 108, a noise component identifying unit 109, a noise canceling signal generating unit 110, a noise canceling signal output unit 111, a measurement data receiving unit 112, a measurement unit 113, an acoustic profile information generating unit 114, and a main control unit 115.

The wireless network interface unit 100 is an interface for wireless connection to the access point 6.

The speaker connection unit 101 includes, although not illustrated in FIG. 4, for each channel, a connection terminal for connection to one of the speakers 2 that corresponds to the channel. In this embodiment, the speaker connection unit 101 includes an FR channel connection terminal for connection to the speaker 2-1 corresponding to the FR channel, an FL channel connection terminal for connection to the speaker 2-2 corresponding to the FL channel, a C channel connection terminal for connection to the speaker 2-3 corresponding to the C channel, an SR connection terminal for connection to the speaker 2-4 corresponding to the SR channel, an SL channel connection terminal for connection to the speaker 2-5 corresponding to the SL channel, and an SW channel connection terminal for connection to the speaker 2-6 corresponding to the SW channel.

The tune acquisition unit 102 accesses the media server 4 via the wireless network interface unit 100 to download a multi-channel audio signal of a tune from the media server 4.

The content storage unit 103 stores the multi-channel audio signal of the tune which has been downloaded from the media server 4.

The test signal source sound storage unit 104 stores the source sound of the test signal.

The acoustic profile information storage unit 105 stores, for each channel of a multi-channel audio signal, acoustic profile information generated by the acoustic profile information generating unit 114. In this embodiment, the acoustic profile information storage unit 105 stores pieces of acoustic profile information of the FR channel, the FL channel, the C channel, the SR channel, the SL channel, and the SW channel.

The audio reproduction unit 106 reproduces, from the multi-channel audio signal stored in the content storage unit 103, audio reproduction signals of a plurality of channels (in this embodiment, the FR channel, the FL channel, the C channel, the SR channel, the SL channel, and the SW channel). The audio reproduction unit 106 then adjusts, for each channel, the output timing and the volume level of the audio reproduction signal in accordance with the acoustic profile information stored in the acoustic profile information storage unit 105, and outputs the audio reproduction signal via the speaker connection unit 101 from the corresponding one of the speakers 2. The audio reproduction unit 106 also reproduces the source sound of the test signal which is stored in the test signal source sound storage unit 104, and outputs a reproduction signal thereof via the speaker connection unit 101 from one of the speakers 2 that is designated by the main control unit 115.

The instruction receiving unit 107 receives various instructions from the wireless terminal 3 via the wireless network interface unit 100.

The collected sound signal receiving unit 108 receives, from the wireless terminal 3, via the wireless network interface unit 100, collected sound signals of ambient sounds at the listening point of the multi-channel audio device 1.

The noise component identifying unit 109 identifies, as noise components, differences between the collected sound signals received by the collected sound signal receiving unit 108 and the audio reproduction signals of the respective channels that have been reproduced by the audio reproduction unit 106 and have been adjusted in output timing and volume level in accordance with the acoustic profile information.

The noise canceling signal generating unit 110 generates noise canceling signals opposite in phase from the noise components identified by the noise component identifying unit 109.

The noise canceling signal output unit 111 outputs the noise canceling signals generated by the noise canceling signal generating unit 110 via the speaker connection unit 101 from one of the speakers 2 that is designated by the main control unit 115.

The measurement data receiving unit 112 receives the measurement data from the wireless terminal 3 via the wireless network interface unit 100.

The measurement unit 113 compares the channel reproduction data and the source sound reproduction data that are included in the measurement data received by the measurement data receiving unit 112, to thereby measure a delay time and an attenuation rate of the channel reproduction data with respect to the source sound reproduction data of the designated channel that is included in the measurement data.

The acoustic profile information generating unit 114 generates acoustic profile information on the designated channel, which includes the output timing and the volume level, based on results (the delay time and the attenuation rate of the channel reproduction data on the designated channel with respect to the source sound reproduction data) of the measurement by the measurement unit 113.

The main control unit 115 centrally controls the units 100 to 114 of the multi-channel audio device 1.

The functional configuration of the multi-channel audio device 1 illustrated in FIG. 4 may be implemented by hardware through use of an integrated logic IC, such as an application specific integrated circuit (ASIC) or a field programmable gate array (FPGA), or may be implemented by software through use of a computer such as a digital signal processor (DSP). As another example, the functional configuration may be implemented on a general computer, such as a PC, including a CPU, a memory, a flash memory, a hard disk drive, or another auxiliary storage device, and a wireless communication device which is a wireless LAN adapter or the like, by the CPU by loading a predetermined program into the memory from the auxiliary storage device and executing the program.

Figure 5:
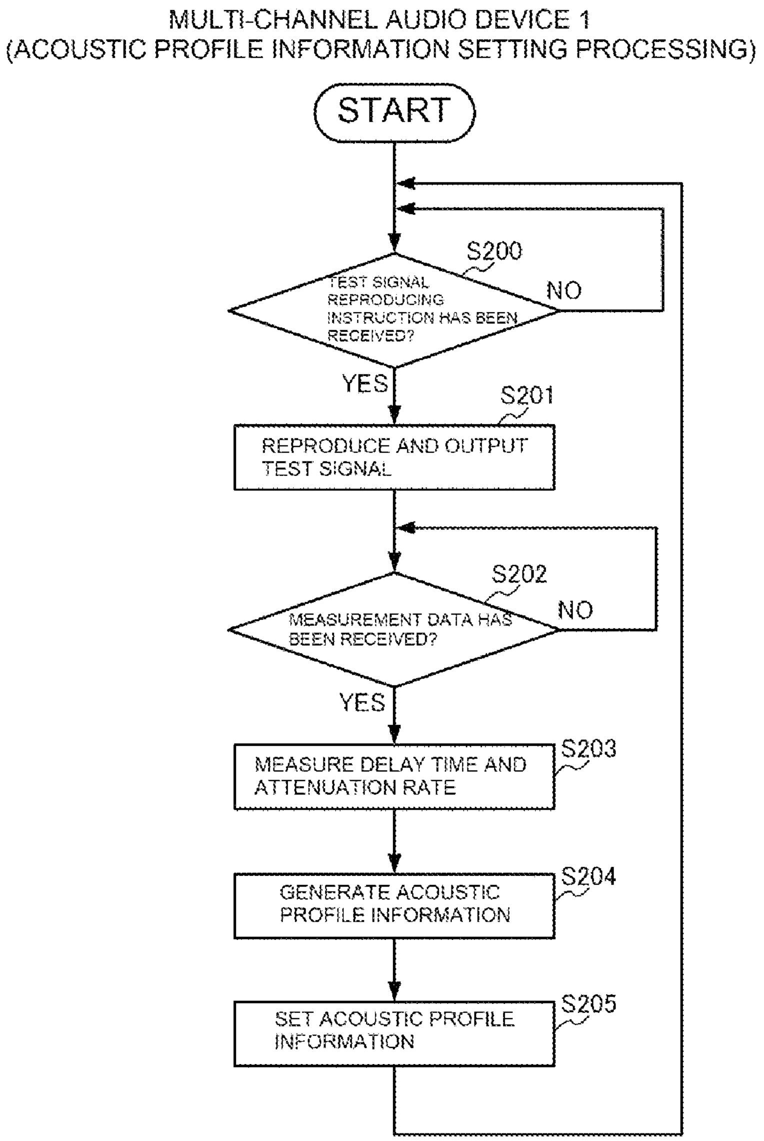
FIG. 5 is a flow chart for illustrating acoustic profile information setting processing of the multi-channel audio device (1).

FIG. 5 is a flow chart for illustrating acoustic profile information setting processing of the multi-channel audio device 1.

The instruction receiving unit 107 receives a test signal reproducing instruction from the wireless terminal 3 via the wireless network interface unit 100 (YES in Step S200), and passes the test signal reproducing instruction to the main control unit 115. The main control unit 115 receives the instruction, reads the source sound of the test signal out of the test signal source sound storage unit 104, and passes the source sound of the test signal along with the designated channel that is included in the test signal reproducing instruction to the audio reproduction unit 106. The audio reproduction unit 106 reproduces the source sound of the test signal that is received from the main control unit 115, and outputs a reproduction signal thereof via the speaker connection unit 101 from one of the speakers 2 that is a speaker of the designated channel received from the main control unit 115 (Step S201).

Next, the measurement data receiving unit 112 receives measurement data from the wireless terminal 3 via the wireless network interface unit 100 (Step S202), and passes the measurement data to the main control unit 115. The main control unit 115 passes the measurement data received from the measurement data receiving unit 112 to the measurement unit 113. The measurement unit 113 receives the measurement data, and compares the channel reproduction data and the source sound reproduction data that are included in the measurement data received from the main control unit 115 to each other to measure a delay time and an attenuation rate of the channel reproduction data with respect to the source sound reproduction data of the designated channel included in the measurement data (Step S203).

Next, the acoustic profile information generating unit 114 generates acoustic profile information of the designated channel, which includes the reproduction timing and the volume level, based on results (the delay time and the attenuation rate of the channel reproduction data with respect to the source sound reproduction data of the designated channel) of the measurement by the measurement unit 113 (Step S204). Specifically, the reproduction timing of the designated channel is determined so that reproduction is started earlier than a standard reproduction timing by the delay time, that is, so that a start timing of the test signal in the channel reproduction data matches a start timing of the test signal in the source sound reproduction data. The volume level of the designated channel is determined so that the attenuation rate of the channel reproduction data of the designated channel to the source sound reproduction data is "1," that is, so that an amplitude of the test signal in the channel reproduction data matches an amplitude of the test signal in the source sound reproduction data.

Next, the main control unit 115 stores the acoustic profile information of the designated channel generated by the acoustic profile information generating unit 114 in the acoustic profile information storage unit 105 in association with the designated channel, to thereby set this piece of acoustic profile information as conditions under which an audio reproduction signal of this designated channel is output (Step S205).

Figure 6:
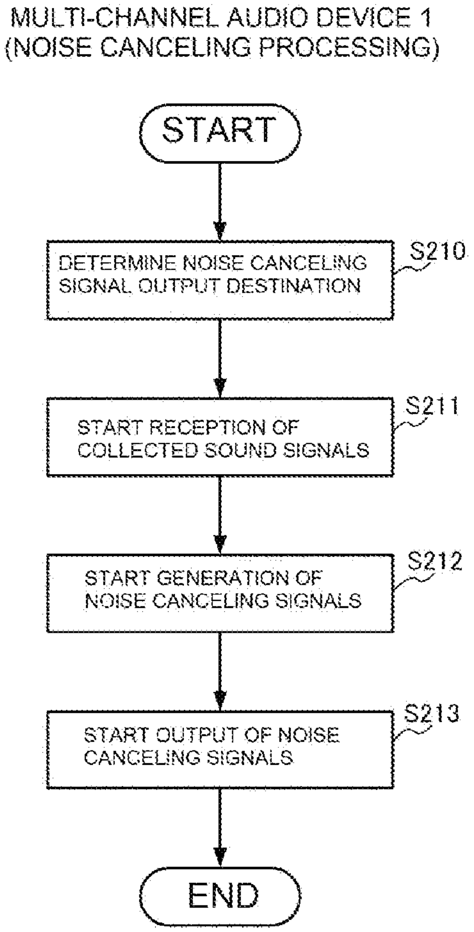
FIG. 6 is a flow chart for illustrating noise canceling processing of the multi-channel audio device (1).

FIG. 6 is a flow chart for illustrating noise canceling processing of the multi-channel audio device 1.

This flow is started by reception of a noise canceling instruction from the wireless terminal 3 when the audio reproduction unit 106 is reproducing and outputting a multi-channel audio signal.

First, the main control unit 115 determines, based on pieces of acoustic profile information of the respective channels stored in the acoustic profile information storage unit 105, which of the speakers 2 is to be a noise canceling signal output destination (Step S210). Specifically, one of the speakers 2 that corresponds to a channel associated with a piece of acoustic profile information including the latest output timing, namely, one of the speakers 2 that is closest to the listening point of the multi-channel audio device 1, is determined to be the noise canceling signal output destination. In a case in which no pieces of acoustic profile information are stored for respective channels in the acoustic profile information storage unit 105, predetermined one of the speakers 2 may be determined as the noise canceling signal output destination. The main control unit 115 then notifies the one of the speakers 2 that is determined to be the noise canceling signal output destination to the noise canceling signal output unit 111.

Next, the collected sound signal receiving unit 108 starts reception of collected sound signals sent from the wireless terminal 3 via the wireless network interface unit 100 (Step S211). The main control unit 115 then sequentially outputs, to the noise component identifying unit 109, the collected sound signals sequentially received by the collected sound signal receiving unit 108, and audio reproduction signals of the respective channels that have been reproduced by the audio reproduction unit 106 and have been adjusted in output timing and volume level in accordance with the pieces of acoustic profile information. In response thereto, the noise component identifying unit 109 identifies, as noise components, differences between the collected sound signals and the audio reproduction signals of the respective channels that are sequentially input from the main control unit 115, and the noise canceling signal generating unit 110 starts generation of noise canceling signals opposite in phase from the noise components identified by the noise component identifying unit 109 (Step S212).

Next, the main control unit 115 starts transmission of the noise canceling signals generated by the noise canceling signal generating unit 110 to the noise canceling signal output unit 111. In response thereto, the noise canceling signal output unit 111 starts outputting, via the speaker connection unit 101, the noise canceling signals sequentially input from the main control unit 115, to the one of the speakers 2 that is the noise canceling signal output destination, so as to superimpose the noise canceling signals on audio reproduction signals output from the one of the speakers 2 (Step S213).

Details of the wireless terminal 3 are described next.

Figure 7:
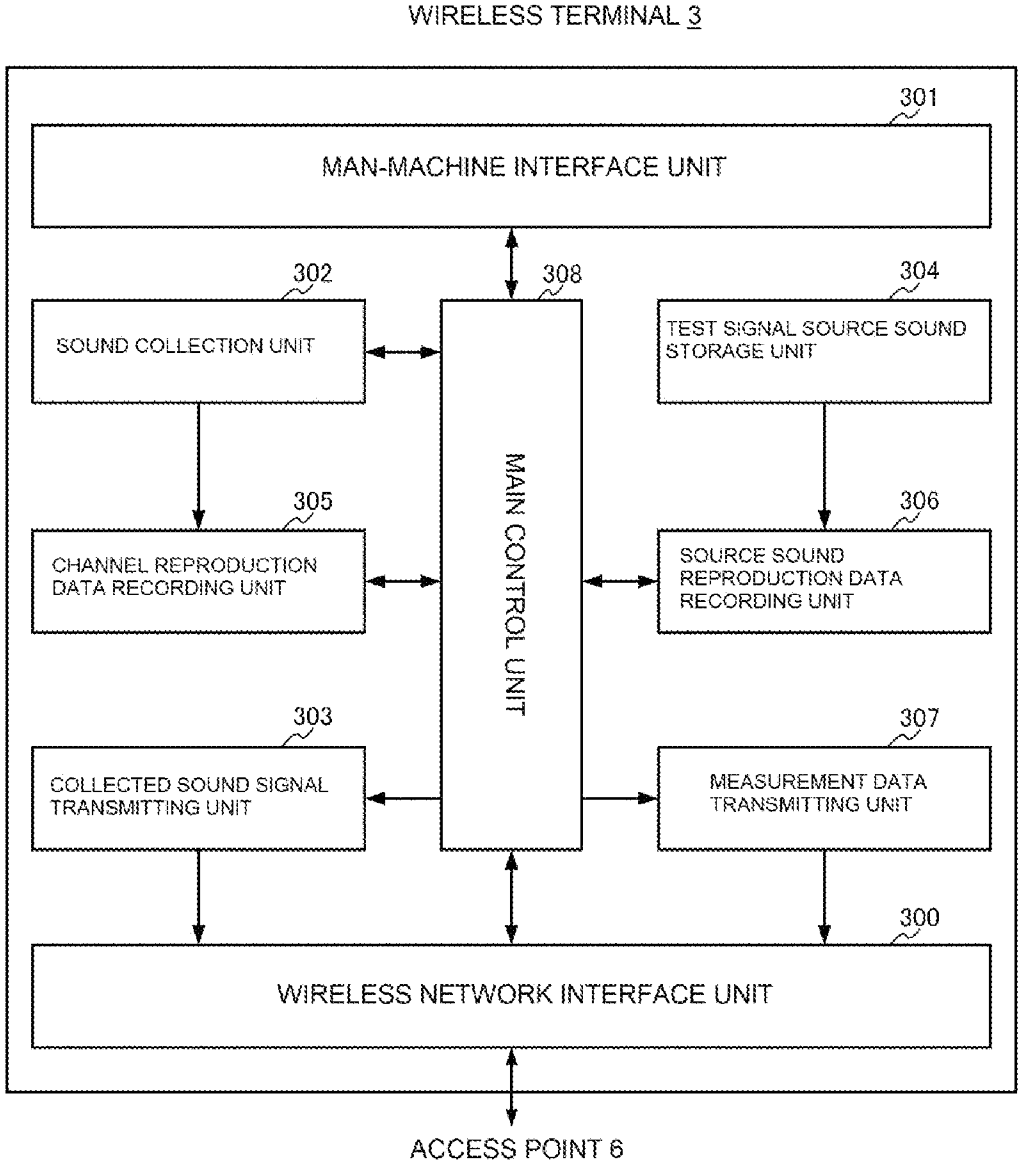
FIG. 7 is a schematic functional configuration diagram of a wireless terminal (3).

FIG. 7 is a schematic functional configuration diagram of the wireless terminal 3.

As illustrated in FIG. 7, the wireless terminal 3 includes a wireless network interface unit 300, a man-machine interface unit 301, a sound collection unit 302, a collected sound signal transmitting unit 303, a test signal source sound storage unit 304, a channel reproduction data recording unit 305, a source sound reproduction data recording unit 306, a measurement data transmitting unit 307, and a main control unit 308.

The wireless network interface unit 300 is an interface for wireless connection to the access point 6.

The man-machine interface unit 301 is an interface for displaying information to the user and for receiving various types of operation from the user, and includes an input/output device such as a touch panel.

The sound collection unit 302 collects ambient sounds around its own wireless terminal 3 via a built-in microphone of its own wireless terminal 3 or a microphone connected to its own wireless terminal 3.

The collected sound signal transmitting unit 303 transmits collected sound signals of the ambient sounds around its own wireless terminal 3 which have been collected by the sound collection unit 302, to the multi-channel audio device 1 via the wireless network interface unit 300.

The test signal source sound storage unit 304 stores the same source sound as a source sound of a test signal output from the multi-channel audio device 1.

The channel reproduction data recording unit 305 records a test signal that is output from one of the speakers 2 of the multi-channel audio device 1 and is collected by the sound collection unit 302, as channel reproduction data of a channel corresponding to the one of the speakers 2.

The source sound reproduction data recording unit 306 reproduces the source sound of the test signal that is stored in the test signal source sound storage unit 304 in synchronization with start of the recording by the channel reproduction data recording unit 305, and records reproduction data thereof as source sound reproduction data.

The measurement data transmitting unit 307 generates measurement data including the channel reproduction data recorded by the channel reproduction data recording unit 305, the source sound reproduction data recorded by the source sound reproduction data recording unit 306, and a designated channel, and transmits the measurement data to the multi-channel audio device 1 via the wireless network interface unit 300.

The main control unit 308 centrally controls the units 300 to 307 of the wireless terminal 3.

The functional configuration of the wireless terminal 3 that is illustrated in FIG. 7 is implemented on a portable computer including a CPU, a memory, a flash memory or another auxiliary storage device, a wireless communication device which is a wireless LAN adapter or the like, a microphone, and a speaker, such as a smartphone, a tablet PC, or a smart speaker, by the CPU by executing a predetermined program.

Figure 8:
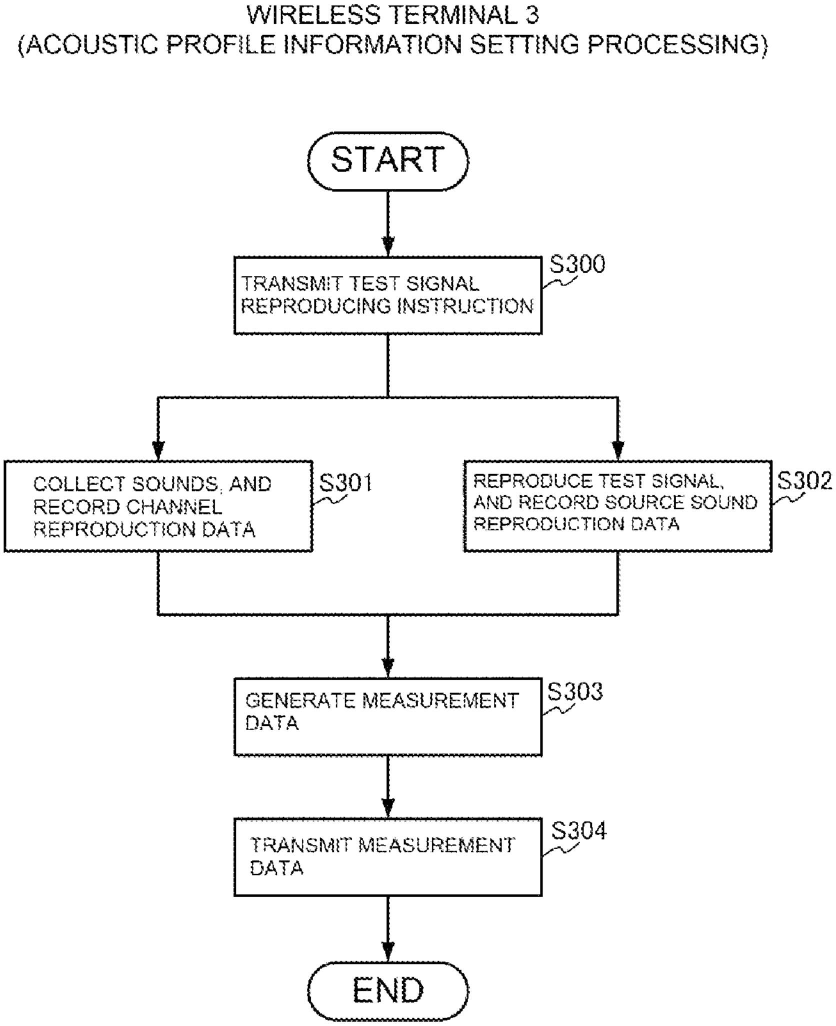
FIG. 8 is a flow chart for illustrating acoustic profile information setting processing of the wireless terminal (3).

FIG. 8 is a flow chart for illustrating acoustic profile information setting processing of the wireless terminal 3.

This flow is started by reception of test signal reproducing operation accompanied by a designated channel from the user at the man-machine interface unit 301.

First, the main control unit 308 transmits, via the wireless network interface unit 300, to the multi-channel audio device 1, a test signal reproducing instruction including the designated channel received with the test signal reproducing operation (Step S300).

Next, the main control unit 308 starts sound collection by the sound collection unit 302, instructs the channel reproduction data recording unit 305 to record, and instructs the source sound reproduction data recording unit 306 to reproduce and record as well. The channel reproduction data recording unit 305 receives the instruction and records, as channel reproduction data, a test signal that is output from one of the speakers 2 of the multi-channel audio device 1 that corresponds to the designated channel and is collected by the sound collection unit 302 (Step S301). The source sound reproduction data recording unit 306 reproduces, in synchronization with the start of the recording by the channel reproduction data recording unit 305, the source sound of the test signal that is stored in the test signal source sound storage unit 304, and records reproduction data thereof as source sound reproduction data (Step S302).

Next, the main control unit 308 passes the channel reproduction data recorded by the channel reproduction data recording unit 305 and the source sound reproduction data recorded by the source sound reproduction data recording unit 306, along with the designated channel, to the measurement data transmitting unit 307. In response thereto, the measurement data transmitting unit 307 generates measurement data including the channel reproduction data, the source sound reproduction data, and the designated channel (Step S303). The measurement data transmitting unit 307 transmits the measurement data to the multi-channel audio device 1 via the wireless network interface unit 300 (Step S304).

Figure 9:
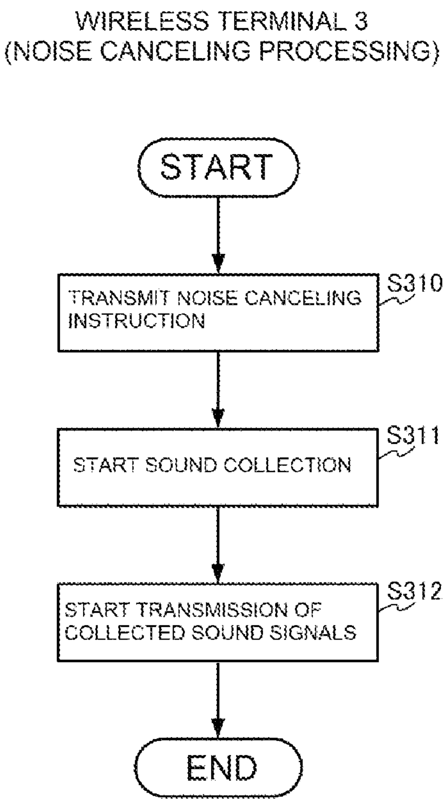
FIG. 9 is a flow chart for illustrating noise canceling processing of the wireless terminal (3).

FIG. 9 is a flow chart for illustrating noise canceling processing of the wireless terminal 3.

This flow is started by reception of the noise canceling operation from the user at the man-machine interface unit 301 when the multi-channel audio device 1 is reproducing and outputting a multi-channel audio signal.

First, the main control unit 308 transmits a noise canceling instruction to the multi-channel audio device 1 via the wireless network interface unit 300 (Step S310). The main control unit 308 then instructs the sound collection unit 302 to start sound collection. The sound collection unit 302 receives the instruction, and starts sound collection of ambient sounds at the listening point of the multi-channel audio device 1 at which its own wireless terminal 3 is placed (Step S311).

Next, the main control unit 308 sequentially outputs collected sound signals of the ambient sounds collected by the sound collection unit 302 to the collected sound signal transmitting unit 303. In response thereto, the collected sound signal transmitting unit 303 starts transmitting, to the multi-channel audio device 1, via the wireless network interface unit 300, the collected sound signals sequentially input from the main control unit 308 (Step S312).

This concludes the description of one embodiment of the present invention.

In this embodiment, the audio reproduction signals of the respective channels output by the multi-channel audio device 1 for each channel separately from the channels' corresponding speakers 2 are collected through sound collection by the wireless terminal 3 placed at the listening point of the multi-channel audio device 1, and collected sound signals thereof are fed back to the multi-channel audio device 1. Further, the multi-channel audio device 1 identifies, as noise components, differences between the collected sound signals fed back from the wireless terminal 3 and the audio reproduction signals of the respective channels output from the speakers 2-1 to 2-6, and noise canceling signals opposite in phase from the noise components are output from one of the speakers 2. Accordingly, even in an environment having noise, comfortable enjoyment of audio contents in multi-channel is accomplished by canceling the noise.

In this embodiment, the wireless terminal 3 provided with the recording and reproducing function, such as a smartphone, a tablet PC, or a smart speaker, is used as the measurement microphone for generating acoustic profile information, and hence a dedicated measurement microphone is not required to be attached to the multi-channel audio device 1. It also suffices that the user places the wireless terminal 3 at the listening point of the multi-channel audio device 1, and the user is not required to connect the wireless terminal 3 and the multi-channel audio device 1 by a cord. Accordingly, acoustic profile information of each channel can be generated by simple operation without increasing cost.

In this embodiment, one of the speakers 2 that corresponds to a channel associated with a piece of acoustic profile information including the latest output timing, namely, one of the speakers 2 that is closest to the listening point of the multi-channel audio device 1, is determined to be the noise canceling signal output destination. Thus, a delay time until a noise canceling signal output from the one of the speakers 2 that is the noise canceling signal output destination reaches the listening point of the multi-channel audio device 1 can be shortened. This decreases a phase shift from the noise at the listening point of the multi-channel audio device 1, with the result that the noise can be canceled out more effectively.

The present invention is not limited to the embodiment described above, and various changes may be made thereto within the scope of the gist of the invention.

For example, the embodiment described above may be modified so that which one of the speakers 2 is the noise canceling signal output destination is switchable by an instruction from the user. That is, the wireless terminal 3 transmits, to the multi-channel audio device 1, a signal for switching the noise canceling signal output destination by following noise canceling signal output destination switching operation received from the user, and the multi-channel audio device 1 receives the signal and switches the noise canceling signal output destination from one of the speakers 2 to another of the speakers 2 in a predetermined order. As another example, the multi-channel audio device 1 is provided with a switching button for switching the noise canceling signal output destination, and switches the noise canceling signal output destination from one of the speakers 2 to another of the speakers 2 in a predetermined order by following the user's operation of the switching button.

In the embodiment described above, the noise canceling signal output destination is determined from among the speakers 2-1 to 2-6 connected to the multi-channel audio device 1. However, the present invention is not limited thereto. The noise canceling signal output destination may be the wireless terminal 3 as long as the wireless terminal 3 includes a speaker. In this case, the multi-channel audio device 1 transmits a noise canceling signal to the wireless terminal 3, and the wireless terminal 3 outputs the noise canceling signal received from the multi-channel audio device 1 from the speaker.

In the embodiment described above, the wireless terminal 3 has functions as a controller for remotely operating the multi-channel audio device 1. However, the present invention is not limited thereto. A dedicated controller may be provided separately from the wireless terminal 3. That is, the controller receives various types of operation from the user and, in response, transmits various instructions to the multi-channel audio device 1. When the multi-channel audio device 1 receives a test signal reproducing instruction from the controller, the multi-channel audio device 1 transmits the test signal reproducing instruction to the wireless terminal 3, and starts the acoustic profile information setting processing illustrated in FIG. 5. The wireless terminal 3 receives the instruction, and executes Step S301 and subsequent steps of the acoustic profile information setting processing illustrated in FIG. 8. In another example, the multi-channel audio device 1 receives a noise canceling instruction from the controller, transmits the noise canceling instruction to the wireless terminal 3, and starts the noise canceling processing illustrated in FIG. 6. The wireless terminal 3 receives the instruction, and executes Step S311 and subsequent steps of the noise canceling processing illustrated in FIG. 9.

Further, in the above-mentioned embodiment, the communication between the multi-channel audio device 1 and the wireless terminal 3 is performed via the access point 6, but the present invention is not limited thereto. Direct wireless communication may be performed between the multi-channel audio device 1 and the wireless terminal 3 by short-range wireless communication such as Bluetooth (trademark).

REFERENCE SIGNS LIST

- 1: multi-channel audio device, 2-1 to 2-6: speaker
- 3: wireless terminal, 4: media server, 5: network
- 6: access point, 100: wireless network interface unit
- 101: speaker connection unit, 102: tune acquisition unit, 103: content storage unit
- 104: test signal source sound storage unit, 105: acoustic profile information storage unit
- 106: audio reproduction unit, 107: instruction receiving unit, 108: collected sound signal receiving unit
- 109: noise component identifying unit, 110: noise canceling signal generating unit
- 111: noise canceling signal output unit, 112: measurement data receiving unit
- 113: measurement unit, 114: acoustic profile information generating unit, 115: main control unit
- 300: wireless network interface unit
- 301: man-machine interface unit, 302: sound collection unit
- 303: collected sound signal transmitting unit, 304: test signal source sound storage unit

305: channel reproduction data recording unit, 306: source sound reproduction data recording unit

307: measurement data transmitting unit, 308: main control unit

The invention claimed is:

1. A multi-channel audio system, comprising:

a multi-channel audio device configured to reproduce and output a multi-channel audio signal with use of a plurality of speakers; and a wireless terminal placed at a listening point of the multi-channel audio device, the wireless terminal including:

sound collection means for collecting ambient sounds at the listening point; and collected sound signal transmitting means for transmitting, to the multi-channel audio device, collected sound signals of the ambient sounds collected by the sound collection means, the multi-channel audio device including:

audio reproduction means for reproducing, from the multi-channel audio signal, audio reproduction signals of a plurality of channels;

audio output means for outputting, for each of the plurality of channels separately, the audio reproduction signals of the plurality of channels reproduced by the audio reproduction means, in a manner that outputs the audio reproduction signal of one channel from one of the plurality of speakers that corresponds to the one channel;

collected sound signal receiving means for receiving the collected sound signals from the wireless terminal;

noise component identifying means for identifying, as noise components, differences between the collected sound signals received by the collected sound signal receiving means and the audio reproduction signals of the plurality of channels that are output by the audio output means from the plurality of speakers;

noise canceling signal generating means for generating noise canceling signals opposite in phase from the noise components identified by the noise component identifying means; and noise canceling signal output means for outputting the noise canceling signals generated by the noise canceling signal generating means from one of the plurality of speakers.

2. The multi-channel audio system according to claim 1, wherein the wireless terminal further includes:

test signal reproduction instruction means for transmitting, to the multi-channel audio device, a test signal reproducing instruction including a designated channel, by following test signal reproducing operation received from a user;

channel reproduction data recording means for recording, as channel reproduction data of the designated channel, a test signal that is output, in response to the test signal reproducing instruction transmitted by the test signal reproduction instruction means, from the multi-channel audio device via a corresponding speaker and collected by the sound collection means, the corresponding speaker being one of the plurality of speakers that corresponds to the designated channel;

source sound reproduction data recording means for reproducing, in synchronization with start of the recording by the channel reproduction data recording means, a source sound of the test signal that is stored in advance, and recording reproduction data of the source sound as source sound reproduction data, without externally outputting the reproduction data of the source sound; and measurement data transmitting means for transmitting, to the multi-channel audio device, measurement data of the designated channel which includes the channel reproduction data of the designated channel recorded by the channel reproduction data recording means and the source sound reproduction data recorded by the source sound reproduction data recording means, and wherein the multi-channel audio device further includes:

test signal reproducing and outputting means for reproducing, by following the test signal reproducing instruction received from the wireless terminal, a source sound of the test signal that is stored in advance, and outputting the source sound from the one of the plurality of speakers that corresponds to the designated channel included in the test signal reproducing instruction;

measurement data receiving means for receiving the measurement data of the designated channel from the wireless terminal;

measurement means for measuring, through a comparison between the channel reproduction data and the source sound reproduction data that are included in the measurement data of the designated channel received by the measurement data receiving means, a delay time and an attenuation rate of the channel reproduction data with respect to the source sound reproduction data of the designated channel;

acoustic profile information generating means for generating, based on the delay time and the attenuation rate measured by the measurement means as the delay time and the attenuation rate of the channel reproduction data with respect to the source sound reproduction data of the designated channel, acoustic profile information of the designated channel which includes an output timing and a volume level; and acoustic profile information setting means for setting the acoustic profile information of the designated channel generated by the acoustic profile information generating means, as conditions under which the audio reproduction signal of the designated channel is output.

3. The multi-channel audio system according to claim 2, wherein the noise canceling signal output means is configured to output the noise canceling signals generated by the noise canceling signal generating means from one of the plurality of speakers that corresponds to one of the plurality of channels that is associated with a piece of the acoustic profile information latest in output timing out of pieces of the acoustic profile information of the plurality of channels.

4. The multi-channel audio system according to claim 2, wherein the noise canceling signal output means is configured to switch from one of the plurality of speakers to another of the plurality of speakers as a speaker to which the noise canceling signals generated by the noise canceling signal generating means are to be output, by following an instruction from the user.

5. The multi-channel audio system according to claim 2, wherein the multi-channel audio device includes, in place of the nose canceling signal output means, noise canceling signal transmitting means for transmitting the noise canceling signals generated by the noise canceling signal generating means to the wireless terminal, and wherein the wireless terminal further includes:

noise canceling signal receiving means for receiving the noise canceling signals from the multi-channel audio device; and noise canceling signal output means for outputting the noise canceling signals received by the noise canceling signal receiving means.

6. A multi-channel audio device for reproducing and outputting a multi-channel audio signal with use of a plurality of speakers, the multi-channel audio device comprising:

audio reproduction means for reproducing, from the multi-channel audio signal, audio reproduction signals of a plurality of channels;

audio output means for outputting, for each of the plurality of channels separately, the audio reproduction signals of the plurality of channels reproduced by the audio reproduction means, in a manner that outputs the audio reproduction signal of one channel from one of the plurality of speakers that corresponds to the one channel;

collected sound signal receiving means for receiving, from a wireless terminal placed at a listening point of the multi-channel audio device, collected sound signals of ambient sounds at the listening point;

noise component identifying means for identifying, as noise components, differences between the collected sound signals received by the collected sound signal receiving means and the audio reproduction signals of the plurality of channels that are output by the audio output means from the plurality of speakers;

noise canceling signal generating means for generating noise canceling signals opposite in phase from the noise components identified by the noise component identifying means; and noise canceling signal output means for outputting the noise canceling signals generated by the noise canceling signal generating means from one of the plurality of speakers.

7. The multi-channel audio device according to claim 6, further comprising:

test signal reproducing and outputting means for reproducing, by following a test signal reproducing instruction which is received from the wireless terminal and which includes a designated channel, a source sound of a test signal that is stored in advance, and outputting the source sound from one of the plurality of speakers that corresponds to the designated channel;

measurement data receiving means for receiving, from the wireless terminal, measurement data of the designated channel which includes channel reproduction data and source sound reproduction data, the channel reproduction data being recorded data of the test signal output from the multi-channel audio device via the one of the plurality of speakers that corresponds to the designated channel, the source sound reproduction data being recorded data of the test signal reproduced by the wireless terminal in synchronization with the output of the test signal in the multi-channel audio device;

measurement means for measuring, through a comparison between the channel reproduction data and the source sound reproduction data that are included in the measurement data of the designated channel received by the measurement data receiving means, a delay time and an attenuation rate of the channel reproduction data with respect to the source sound reproduction data of the designated channel;

acoustic profile information generating means for generating, based on the delay time and the attenuation rate measured by the measurement means as the delay time and the attenuation rate of the channel reproduction data with respect to the source sound reproduction data of the designated channel, acoustic profile information of the designated channel which includes an output timing and a volume level; and acoustic profile information setting means for setting the acoustic profile information of the designated channel generated by the acoustic profile information generating means, as conditions under which the audio reproduction signal of the designated channel is output.

8. A program stored on a non-transitory computer readable medium executable by a computer, the program causing the computer to function as a multi-channel audio device for reproducing and outputting a multi-channel audio signal with use of a plurality of speakers, the multi-channel audio device including:

audio reproduction means for reproducing, from the multi-channel audio signal, audio reproduction signals of a plurality of channels;

audio output means for outputting, for each of the plurality of channels separately, the audio reproduction signals of the plurality of channels reproduced by the audio reproduction means, in a manner that outputs the audio reproduction signal of one channel from one of the plurality of speakers that corresponds to the one channel;

collected sound signal receiving means for receiving, from a wireless terminal placed at a listening point of the multi-channel audio device, collected sound signals of ambient sounds at the listening point;

noise component identifying means for identifying, as noise components, differences between the collected sound signals received by the collected sound signal receiving means and the audio reproduction signals of the plurality of channels that are output by the audio output means from the plurality of speakers;

noise canceling signal generating means for generating noise canceling signals opposite in phase from the noise components identified by the noise component identifying means; and noise canceling signal output means for outputting the noise canceling signals generated by the noise canceling signal generating means from one of the plurality of speakers.

9. The program according to claim 8, wherein the multi-channel audio device further includes:

test signal reproducing and outputting means for reproducing, by following a test signal reproducing instruction which is received from the wireless terminal and which includes a designated channel, a source sound of a test signal that is stored in advance, and outputting the source sound from one of the plurality of speakers that corresponds to the designated channel;

measurement data receiving means for receiving, from the wireless terminal, measurement data of the designated channel which includes channel reproduction data and source sound reproduction data, the channel reproduction data being recorded data of the test signal output from the multi-channel audio device via the one of the plurality of speakers that corresponds to the designated channel, the source sound reproduction data being recorded data of the test signal reproduced by the wireless terminal in synchronization with the output of the test signal in the multi-channel audio device;

measurement means for measuring, through a comparison between the channel reproduction data and the source sound reproduction data that are included in the measurement data of the designated channel received by the measurement data receiving means, a delay time and an attenuation rate of the channel reproduction data with respect to the source sound reproduction data of the designated channel;

acoustic profile information generating means for generating, based on the delay time and the attenuation rate measured by the measurement means as the delay time and the attenuation rate of the channel reproduction data with respect to the source sound reproduction data of the designated channel, acoustic profile information of the designated channel which includes an output timing and a volume level; and acoustic profile information setting means for setting the acoustic profile information of the designated channel generated by the acoustic profile information generating means, as conditions under which the audio reproduction signal of the designated channel is output.

10. A multi-channel audio reproduction method using a multi-channel audio device and a wireless terminal, the multi-channel audio device being configured to reproduce and output a multi-channel audio signal with use of a plurality of speakers, the wireless terminal being placed at a listening point of the multi-channel audio device, the multi-channel audio reproduction method comprising:

collecting, by the wireless terminal, ambient sounds at the listening point, and transmitting collected sound signals of the ambient sounds to the multi-channel audio device;

reproducing, by the multi-channel audio device, from the multi-channel audio signal, audio reproduction signals of a plurality of channels, and outputting, for each of the plurality of channels separately, the audio reproduction signals of the plurality of channels in a manner that outputs the audio reproduction signal of one channel from one of the plurality of speakers that corresponds to the one channel; and identifying, by the multi-channel audio device, as noise components, differences between the collected sound signals received from the wireless terminal and the audio reproduction signals of the plurality of channels that are output from the plurality of speakers, generating noise canceling signals opposite in phase from the noise components, and outputting the noise canceling signals from one of the plurality of speakers.

11. The multi-channel audio reproduction method according to claim 10, further comprising:

transmitting, by the wireless terminal, to the multi-channel audio device, a test signal reproducing instruction including a designated channel, by following test signal reproducing operation received from a user, collecting, through sound collection, a test signal that is output, in response to the test signal reproducing instruction, from the multi-channel audio device via one of the plurality of speakers that corresponds to the designated channel, and recording the collected test signal as channel reproduction data of the designated channel;

reproducing, by the wireless terminal, in synchronization with start of the recording of the channel reproduction data of the designated channel, a source sound of the test signal that is stored in advance, and recording reproduction data of the source sound as source sound reproduction data, without externally outputting the reproduction data of the source sound;

transmitting, by the wireless terminal, to the multi-channel audio device, measurement data of the designated channel which includes the recorded channel reproduction data of the designated channel and the recorded source sound reproduction data;

reproducing, by the multi-channel audio device, by following the test signal reproducing instruction received from the wireless terminal, a source sound of the test signal that is stored in advance, and outputting the source sound from the one of the plurality of speakers that corresponds to the designated channel included in the test signal reproducing instruction;

receiving, by the multi-channel audio device, the measurement data of the designated channel from the wireless terminal, and measuring, through a comparison between the channel reproduction data and the source sound reproduction data that are included in the measurement data of the designated channel, a delay time and an attenuation rate of the channel reproduction data with respect to the source sound reproduction data of the designated channel;

generating, by the multi-channel audio device, based on the delay time and the attenuation rate measured as the delay time and the attenuation rate of the channel reproduction data with respect to the source sound reproduction data of the designated channel, acoustic profile information of the designated channel which includes an output timing and a volume level; and setting, by the multi-channel audio device, the generated acoustic profile information of the designated channel as conditions under which the audio reproduction signal of the designated channel is output.

* * * * *